March 11, 1947.  E. C. BOHALL ET AL  2,417,232
HYDRAULIC PULSATOR TRANSMISSION AND CONTROL SYSTEM
Filed July 11, 1944  2 Sheets-Sheet 1
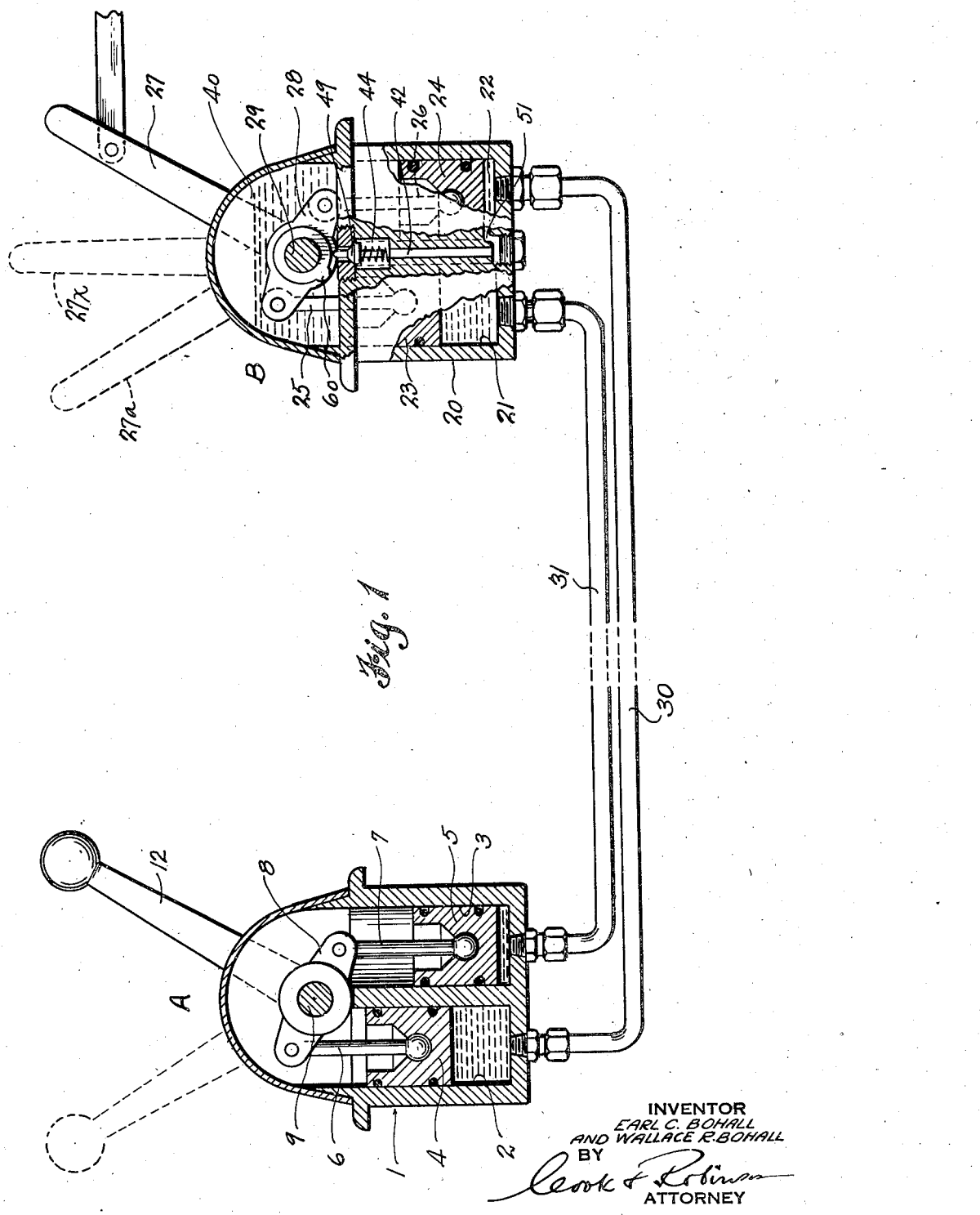
INVENTOR
EARL C. BOHALL
AND WALLACE R. BOHALL
BY
ATTORNEY

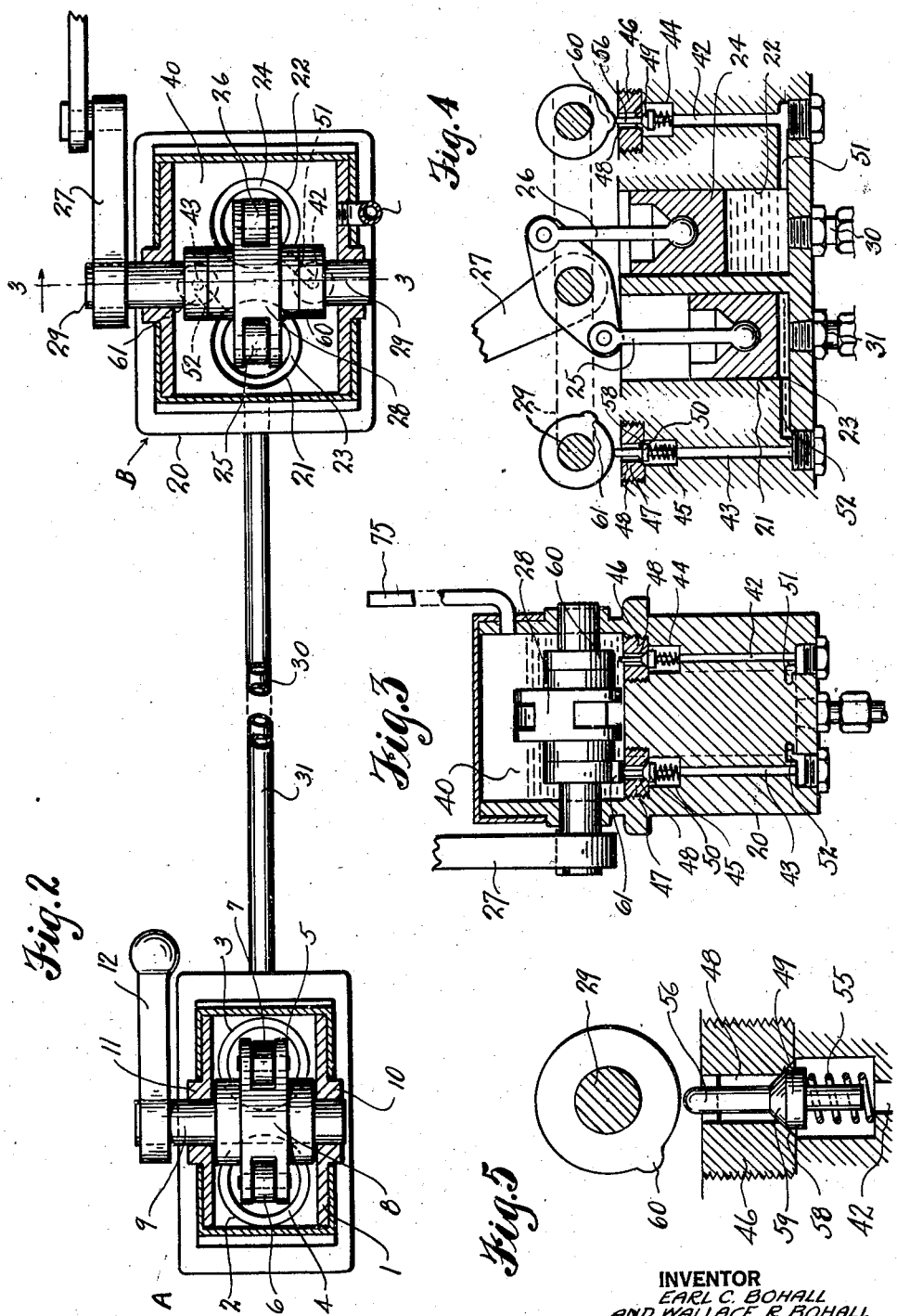

Patented Mar. 11, 1947

2,417,232

UNITED STATES PATENT OFFICE 2,417,232

HYDRAULIC PULSATOR TRANSMISSION AND CONTROL SYSTEM

Earle C. Bohall, Oklahoma City, Okla., and Wallace R. Bohall, Seattle, Wash.

Application July 11, 1944, Serial No. 544,452

3 Claims. (Cl. 60—54.5)

This invention relates to hydraulic power transmission and control systems, and it has reference more particularly to improvements in those types of systems of remote control referred to in the art as "pulsator systems," wherein a piston of a transmitter unit is operable in one cylinder of a closed, hydraulic system, to effect, through the mediacy of the confined hydraulic medium, an instant and corresponding movement of a piston in the cylinder of a receiver unit, generally located remote from the transmitter cylinder for the actuation of some device or mechanism.

To impart a better understanding of the invention and its purposes, it will be explained that in such power transmission systems as above identified, involving the use of two or more hydraulic cylinders and connecting pipe lines, leakage sometimes does, or is apt to occur about the pistons, or in valves or fittings, and there may also be loss of hydraulic pressure medium due to "weeping" or seepage through the pores of the materials used. Also, temperature changes will cause an increase or a decrease in hydrostatic pressure in the system, making the parts either very hard to operate or loose in their action. However, it is quite important to successful operation of such systems, as is well known to those familiar with the art, that the pressure lines and cylinders be maintained filled with the hydraulic medium at all times, and that no air pockets or vacuum spaces be permitted to exist since this results in the transmitter and receiver pistons of the system becoming loose, out of synchronism, or out of proper adjustment.

In view of the foregoing, it has been the principal object of this invention to provide a means that is applicable to hydraulic pulsator systems of the character described, whereby any deviation from an exact synchronization of pistons in the transmitter and receiver units that may result from "weeping," leakage or temperature changes, will be automatically corrected; that is, means whereby synchronization of parts will be automatically maintained.

More specifically stated, the invention resides in the provision in a closed hydraulic system, of a storage reservoir for an auxiliary supply of hydraulic medium from which any deficiency in the system will be automatically replaced and into which reservoir any oversupply that may exist in any line, or connection from any reason, will be released through the action of relief valves of novel arrangement and mode of operation.

It is a further object of the present invention to provide a novel arrangement of valves in connection with the cylinders of the receiver unit, whereby movement of the transmitter pistons to either extreme of travel will effect the release of any over supply of hydraulic medium in one line and the replenishing of any deficiency in the other required for re-establishing synchronism of the transmitter and receiver units.

Still further objects of the invention reside in the details of construction of parts, in their combination, and in their mode of operation, as will hereinafter be fully described.

In accomplishing these and other objects of the invention, we have provided the improved details of construction, the preferred forms of which are illustrated in the accompanying drawings, wherein—

Fig. 1 is a view illustrating the essential parts of hydraulic control system embodying improvements of the present invention; the cylinder housing of the transmitter unit and part of the housing of the receiver unit being shown in cross section for better understanding of the operation.

Fig. 2 is a top view of the units shown in Fig. 1, parts being in section for better illustration.

Fig. 3 is a cross section on the line 3—3 in Fig. 2, particularly showing the valve arrangement, and showing the reservoir for storage of auxiliary hydraulic medium.

Fig. 4 is a schematic, sectional view, indicating the relationship of valve control cams and pistons in the cylinders of the receiver unit.

Fig. 5 is an enlarged, sectional view of one of the valves and its actuating cam.

Referring more in detail to the drawings—

In Figs. 1 and 2, we have illustrated a typical arrangement of parts of a hydraulic control system of a type for which the present invention is applicable. At one end of the system is the transmitter unit, designated in its entirety by reference character A, and at the other end of the system is the receiver unit, designated in its entirety by reference character B.

The transmitter unit comprises a housing 1 formed with two parallel cylinders 2 and 3 in which, respectively, pistons 4 and 5 are reciprocally contained. The pistons are operatively connected, respectively, by rods or links 6 and 7 with the opposite ends of a cross arm 8 that is keyed or otherwise fixed on a control shaft 9 which is rotatably mounted in bearings 10 and 11 in opposite side walls of the housing 1 as noted in Fig. 2. One end of this shaft extends beyond the housing wall, and fixed thereto is a control lever arm, or handle 12 whereby the shaft 9 may be manually rotatably moved to actuate the pistons in their cylinders. The lever arm 8, and the connecting rods 6 and 7, are so arranged that with the rotatable movement of the shaft 9, the pistons 4 and 5 will move in opposite directions in their respective cylinders and in equal amounts. Furthermore it is understood that the cylinders 4 and 5 are equal to each other in diameter.

The receiver unit B comprises a cylinder housing 20 that is formed with two parallel cylinders 21 and 22, in which, respectively, pistons 23 and 24 are reciprocally contained. These pistons are operatively connected, respectively, by rods 25 and 26 with a cross arm 28 on shaft 29. Shaft 29 is rotatably supported at its ends in bearings in the opposite side walls of the housing with one end thereof projecting beyond the housing wall and there equipped with a lever arm 27 to which a link, cable or other device, as seen in Fig. 2, may be connected for the control or actuation of some member.

It is to be understood that the cylinders 21 and 22 of the receiver unit are alike in diameter and that the cross arm 28 and its piston connections are such that the pistons 23 and 24 will move in opposite directions and to equal amounts. The lower ends of the cylinders in each unit are closed, and, as shown in Fig. 1, a pipe line 30 connects the cylinders 2 and 22, while a similar pipe line 31 connects the cylinders 3 and 33. The cylinders and their pipe connections are filled with a suitable hydraulic pressure medium which might be oil or alcohol or other suitable liquid medium.

With this arrangement of parts, it will be understood that when the hand lever 12 is actuated, for example, from the full line position shown in Fig. 1, to the dotted line position, the hydraulic medium forced from cylinder 2 through pipe 30 into cylinder 22 will cause upward movement of the piston 24 in the cylinder 22 of the receiver thereby to rotate shaft 29 and cause movement of the lever arm 27 from its full line position in Fig. 1 to the dotted line, opposite position 27a. Likewise, movement of lever arm 12 from dotted line position to full line position in Fig. 1, will cause lever arm 27 to swing from dotted line position 27a to full line position.

As was previously stated, leakage, past piston walls, or loss of the hydraulic medium due to seepage or "weeping," or any changes in volume in lines that might be due to temperature changes, causes the parts 12 and 27 to become out of synchronism or normal adjustment, and to correct any departure from synchronism that results, I have provided a novel valve mechanism and controls therefor whereby hydraulic medium may be either admitted to or released from the connections as may be required to restore the parts to synchronization.

By reference more particularly to Figs. 3 and 4, it will be observed that the housing 20 of the receiver unit comprises a chamber 40 containing an auxiliary supply of hydraulic pressure medium. Formed vertically in the body of the housing 20 at opposite sides of the cylinders therein, are vertical channels 42 and 43, each of which is counterbored at its upper end, which opens into the chamber 40, to provide the valve chambers 44 and 45, to which plugs 46 and 47 are fitted. Each plug has a central bore 48 therethrough and in these plugs, back check valves 49 and 50 are seated. In Fig. 4, it is shown that the channel 42 has a passage 51 from its lower end into the lower end of cylinder 22 while the channel 43 has a passage 52 from its lower end opening into the cylinder 21.

The two back check valves 49 and 50 are normally held closed by springs 55 acting thereagainst, and each valve has a vertical stem 56 projecting into the chamber 40 beyond the face of the mounting plug whereby the valve may be depressed to an open position.

The plugs 46 and 47 have conical seats 58 against which conical end surfaces 59 of the valves are engaged to close the valve passages 48.

Fixed on the cross shaft 29 at opposite sides of the cross arm 28 are cams 60 and 61. Cam 60 is so fixed on shaft 29 that it will contact the upper end of stem 56 of valve 49 and depress the valve to open position as the lever arm 27 reaches the limit of its travel in moving from right to left as seen in Fig. 1. Likewise, the cam 61 is so fixed on the shaft 29 that it will engage the stem 56 of valve 50 and move the valve to open position when the lever arm 27 reaches the final limit of its travel in moving from left to right. When the lever 27 is located at the full line position of Fig. 1, which is its limit of travel in that direction, then valve 50 is open and valve 49 is closed. When the lever 27 is at its opposite limit, the dotted line position 27a in Fig. 1, then valve 49 is open and valve 50 closed. At any intermediate position of the lever 27, both valves 49 and 50 are closed.

It has been found most practical that the cams be so located that they cause opening of their corresponding valves, as the lever 27 moves through the last four degrees in reaching its limit of travel in either direction.

Assuming that the two units A and B have for some reason become out of synchronism; for example, assume that when the operating lever arm 12 of unit A is at the position of extreme travel in one direction, indicated by its full line showing in Fig. 1, that the lever 27 has shifted from its extreme position, indicated by its full line showing, to the upright dash line position 27x. These parts may be restored to synchronism by moving the lever 12 to its extreme left side position, indicated by the dotted line showing in Fig. 1. With this travel of the lever arm 12 from one extreme to the other, the piston 4 is moved to its lower limit, and piston 5 is moved to its upper limit, thus reversing their showing in Fig. 1. Hydraulic pressure medium is forced from cylinder 2, through pipe line 30 into cylinder 22. This moves the piston 24 upwardly, and through the arm 28 and shaft 29 causes piston 23 to move downwardly.

Due to the parts being out of synchronism to the extent previously stated, it is apparent that the piston 24 will reach its limits of upward travel before the piston 4 has reached its lower limit of movement or piston 5 has reached its upper limit of travel.

This condition will be automatically corrected due to the fact that as the lever 27 reaches its final travel toward the left, as shown in Fig. 1, the cam 60 that is fixed to shaft 29, contacts the stem 56 of valve 49 and depresses the valve to its open position. This opens the channel 42 for bypassing the excess hydraulic medium from the cylinders 2 and 22 and their pipe connection, through channels 51 and 42 past the open valve and into the chamber 40, permitting piston 4 to be moved to its lower limit of travel while piston 24 is retained at its upper limit of travel. Piston 5 will then be at its upper limit of travel and piston 23 at its lower limit and the parts 12 and 27 will be restored to synchronism.

In this correcting operation, it is also understood that the piston 5 moved to its upper limit of travel after the piston 23 had reached its lower limit of travel, and therefore this continued upward travel of piston 5 that was permitted by reason of the opening of valve 49, created suction in pipe line 31, and this suction, being transmitted to cylinder 21, and through passages 52 and 43 to the under side of valve 50, caused this valve to open and liquid to be drawn from the chamber 40 to replenish the deficiency at this side of the system. Thus, both sides of the system were then completely filled and both sides restored to correct adjustment and proper synchronism.

It is important in use of this device, that the storage reservoir 40 be higher than the unit A so that the system will be kept filled. If, for any reason, it is not possible or practical for unit B to be placed higher than unit A, then a standpipe, as indicated at 75 in Fig. 3, can be connected with the reservoir and extended to a height above the unit A. This standpipe then can be kept filled with the hydraulic medium or connected with a supply tank.

While we have illustrated check valves of the poppet type, it is understood that ball check or other types might be employed with satisfactory results.

It is to be understood that the present valve arrangement is also applicable to systems employing single double-ended pistons movable in transmitter cylinders and receiver cylinders arranged after the fashion of those shown in the copending application of R. F. Carr et al., filed August 4, 1941, under Serial No. 405,382, now Patent No. 2,334,383. In such instance, valve equipped connections would be made between the storage reservoir and the opposite ends of the cylinder and cams would be arranged on the rotatable, piston-actuated shaft, to control the valves for the same purpose as herein previously explained.

Having thus described our invention, what we claim as new therein and desire to secure by Letters Patent is:

1. In a closed hydraulic system of control including a transmitter cylinder, a receiver cylinder, a piston in the transmitter cylinder, equipped with means for effecting positive operating movements thereof, a piston in the receiver cylinder, pressure transmission conduits connecting the cylinders whereby positive movements of the transmitter piston cause corresponding movements of the receiver piston, a container for an auxiliary supply of hydraulic pressure medium, channels from said container for gravity flow of medium to the opposite sides of the pressure system, back check valves in said channels arranged to normally sustain medium in the system against operating pressures, a shaft operable in opposite directions in accordance with travel of the receiver piston in opposite directions, and means on said shaft whereby movement of the receiver piston to either of its extremes of travel will unseat the back check valve at the pressure side of the system for the ejection into the auxiliary supply container of any excess medium then existing in that side of the system, leaving the valve at the opposite side free to open under suction for replenishing any deficiency of medium in the opposite side of the system.

2. In a closed hydraulic system of control, a transmitter unit comprising paired cylinders, pistons operable therein, a rock shaft, a cross arm on the shaft operatively connected at its ends with the pistons, an actuator lever for the shaft, a receiver unit comprising paired cylinders, pistons operable therein, a rock shaft, a cross arm on the shaft operatively connected at its ends to the pistons, pressure conduits connecting the cylinders of the transmitter unit with those of the receiver unit in a manner whereby the rock shaft of the receiver will be caused to rotate in accordance with rotative adjustment of the rock shaft of the transmitter, an auxiliary reservoir in the receiver unit for a hydraulic pressure medium, channels from said reservoir to opposite sides of the hydraulic system, back check valves in said channels, cams on the rock shaft of the receiver unit, each for opening one of said valves when the shaft has been actuated to one of its extreme positions.

3. In a hydraulic system, a transmitter means, a receiver cylinder, a piston means movable therein between established limits of travel, pressure conduits connecting the opposite sides of the transmitter means with opposite sides of the receiver cylinder, a storage reservoir for an auxiliary supply of hydraulic medium, channels from said reservoir to the opposite sides of the hydraulic system, a back check valve in each channel for holding pressure in the system, and a shaft connected with the piston means for rotation in opposite directions with movement of the piston means in opposite directions, and means actuated by the shaft with the movement of the piston means to its extremes of travel for unseating the valve in the channel that opens to that side of the system which is, at that time, the pressure side.

EARLE C. BOHALL.
WALLACE R. BOHALL.

REFERENCES CITED

The following references are of record in the file of this patent:

UNITED STATES PATENTS

| Number | Name | Date |
|---|---|---|
| 976,907 | Pagendarm | Nov. 29, 1910 |
| 1,213,721 | Williamson | Jan. 23, 1917 |
| 2,243,385 | Levy | May 27, 1941 |
| 2,330,678 | Carlton | Sept. 28, 1943 |

FOREIGN PATENTS

| Number | Country | Date |
|---|---|---|
| 473,909 | British | Oct. 22, 1937 |
| 500,673 | British | Feb. 14, 1939 |